W. SCHMID.
ARTIFICIAL FISH BAIT.
APPLICATION FILED JULY 14, 1921.
1,417,574.
Patented May 30, 1922.
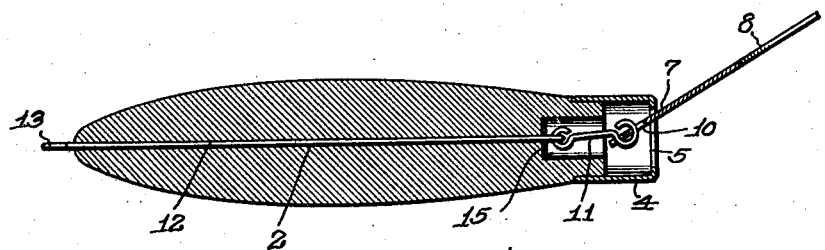
Fig. 1.
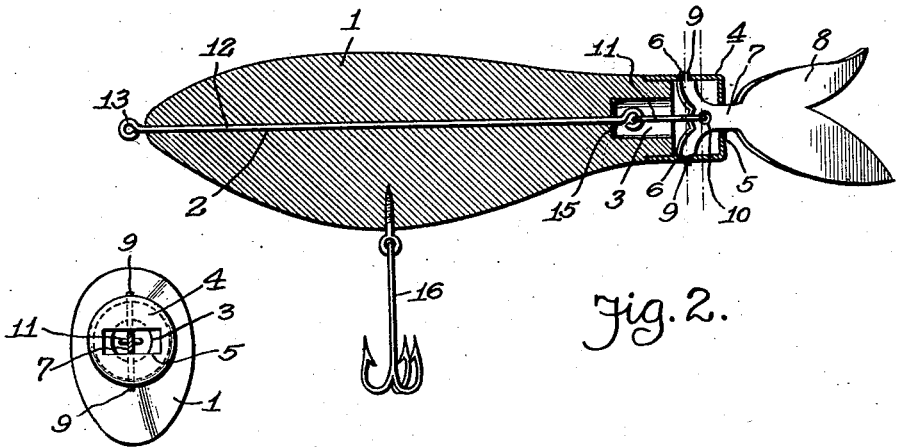
Fig. 2.
Fig. 3.
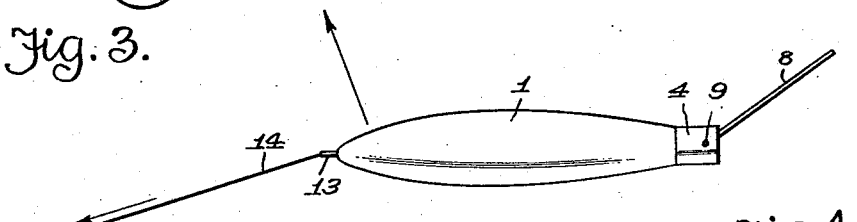
Fig. 4.
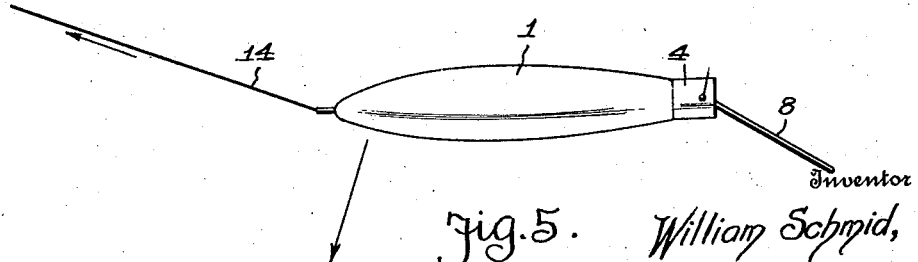
Fig. 5.
Inventor
William Schmid,
By
Attorneys

UNITED STATES PATENT OFFICE.

WILLIAM SCHMID, OF BRONSON, MICHIGAN.

ARTIFICIAL FISH BAIT.

1,417,574.  Specification of Letters Patent.  Patented May 30, 1922.

Application filed July 14, 1921. Serial No. 484,622.

*To all whom it may concern:*

Be it known that I, WILLIAM SCHMID, a citizen of the United States of America, residing at Bronson, in the county of Branch and State of Michigan, have invented certain new and useful Improvements in Artificial Fish Bait, of which the following is a specification, reference being had therein to the accompanying drawings.

This invention relates to artificial fish bait and especially to that class of lures or baits having vanes, rudders or tail pieces controlling, to a certain extent, the movement of the bait in a body of water, and wherein the vane, rudder or tail piece is connected to or under the influence of a fish line.

The primary object of my invention is to provide an artificial bait of the above class which will have a wide range of action in or on a body of water and by traversing a wider path or greater area than the well known type of "wobbler" bait or plug there is a greater chance of attracting a fish, and a fisherman may be saved considerable labor, especially when wading a stream.

Another object of this invention is to provide an artificial bait with a tail piece that may remain in one position as the bait is forcibly moved, and shift to another position, under the influence of a current of water, when the bait is free to move.

A further object of this invention is to provide an artificial bait with a tail piece pivoted to the body of the bait at a right angle to the direction of travel for the bait, the tail piece being free to swing in a lateral direction and steer the bait to one side or the other. In order that the tail piece may be controlled a line member and link are articulated with the tail piece, at a point between the plane of the pivot and the rear end of the tail piece. With the line member and link axially of the bait, it is possible to fix or hold the tail piece stationary relative to the bait body during movement of the bait body by a fish line.

A still further object of this invention is to provide an artificial bait body which is simple in construction, susceptible to any lure finish, and to which any number or style of hooks may be attached.

The above and other objects are attained by a construction that will be hereinafter described and then claimed, and reference will now be had to the drawing, wherein Figure 1 is a horizontal sectional view of the artificial fish bait;

Fig. 2 is a vertical longitudinal sectional view of the same;

Fig. 3 is a view of the rear end of the fish bait, with the tail piece in cross section and the gang hook removed, and Figs. 4 and 5, are diagrammatic plan views showing different conditions of the bait.

In the drawing, the reference numeral 1 denotes a bait body that may be made of any suitable material, preferably buoyant material as wood, and the body may have any desired shape and exterior finish, preferably a shape and finish in imitation of a minnow or small aquatic animal.

The body 1 is provided with a longitudinal bore 2 communicating with a recess 3 in the rear end of the body, and suitably mounted on the rear end of the body is a hollow cap or housing 4 provided with a rear opening 5 and vertically alining openings 6.

Extending through the opening 5 is the neck portion 7 of a vane, rubber or tail piece 8 which may have the shape representing a fin. The inner end of the tail piece is bifurcated and provided with pintles or trunnions 9 extending into the openings 6, so that the tail piece will be pivoted or trunnioned in a vertical plane, as indicated by dot and dash line in Fig. 2, at a right angle to the longitudinal axis of the bait body. The tail piece may therefore swing in a lateral plane, from one side of the bait to the other and the movement of the tail piece is defined by the end walls of the opening 5.

The neck portion 7 of the tail piece 8 has an opening 10, in the rear of the pivotal plane of the tail piece, and loosely connected to the tail piece 8, by virtue of the opening 10 is a link 11 which extends into the recess 3 and is loosely connected to a line member 12 extending through the bore 2 of the bait body 1, said line member having an eye 13 at its forward end so that a fish line 14 may be connected thereto.

In the inner end of the recess 3 is a metallic abutment 15 which limits the forward movement of the line member 12 and a slight longitudinal movement of the line member 12 in the bore 2 permits of the tail piece 8 swinging from one side to the other; the two positions of the tail piece being shown in Figs. 4 and 5.

One or more gang hooks 16 may be suitably attached to the bait body.

The artificial bait may be cast in the usual and well known manner and if there is slack in the line 14 the bait body may float down stream or remain dormant, but when the line 14 is taut the tail piece 8 will be held stationary to one side or the other of the medial plane of the bait. When so held moving water impinging against the tail piece will turn the nose or head of the artificial bait body in one direction or the other, as indicated approximately, by arrows in Figs. 4 and 5, and the same result is attained in a still body of water when the line 14 is pulled upon. By intermittently permitting slack in the line 14 the tail piece 8 may be flopped from one side to the other, and this is particularly true when the bait is in running water and being pulled against the flow of the water. It is then possible to cause the bait to traverse or zigzag over or through a large area of the stream, and after the fisherman is familiar with the action of the bait it will be possible to cast the bait in locations where the effect of water against the tail piece of the bait will cause it to travel into inaccessible pools or places where the bait could not be conveniently cast. By manual manipulation of the bait or the action of a stream of water against the bait, it is possible to steer the bait in a desired direction, and I attach considerable importance to the manner in which the line member is articulated relative to the tail piece, so that the former may adjust the latter.

One embodiment of my invention has been illustrated, but it is to be understood that the structural elements are susceptible to such changes, in size, shape and manner of assemblage, as fall within the scope of the appended claims.

What I claim is:—

1. An artificial bait having a pivoted tail piece, and a line member connected to said tail piece in the rear of the pivot of said tail piece.

2. An artificial bait having a pivoted tail piece, with a defined lateral movement, and a line member axially of said bait and loosely attached to said tail piece between its plane of pivot and the rear end of said tail piece and adapted for shifting said tail piece.

3. An artificial bait comprising a body, a tail piece, pivoted to said body in a plane at a right angle to its direction of travel and free to swing in a lateral direction and steer said bait to one side or the other, and means adapted for simultaneously moving said bait and holding the tail piece stationary relative to said bait body.

4. An artificial bait as in claim 3, wherein said means includes a line member axially of said bait body and a link connecting said line member to said tail piece.

5. An artificial bait comprising a body, a housing at the rear end thereof, a tail piece exteriorly of said housing and having its inner end pivoted in said housing so that said tail piece may swing in a lateral plane, and a line attaching link axially of said body and extending into said housing and connected to said tail piece in the rear of the pivotal plane of said tail piece and adapted for shifting said tail piece.

In testimony whereof I affix my signature in presence of two witnesses.

WILLIAM SCHMID.

Witnesses:
B. P. TAGGART,
L. T. SHAFFMASTER.